Aug. 28, 1962  S. A. WARD  3,051,781
MEANS OF CONVERTING ELECTRICAL SIGNALS TO VISIBLE PICTURES
Filed April 4, 1960
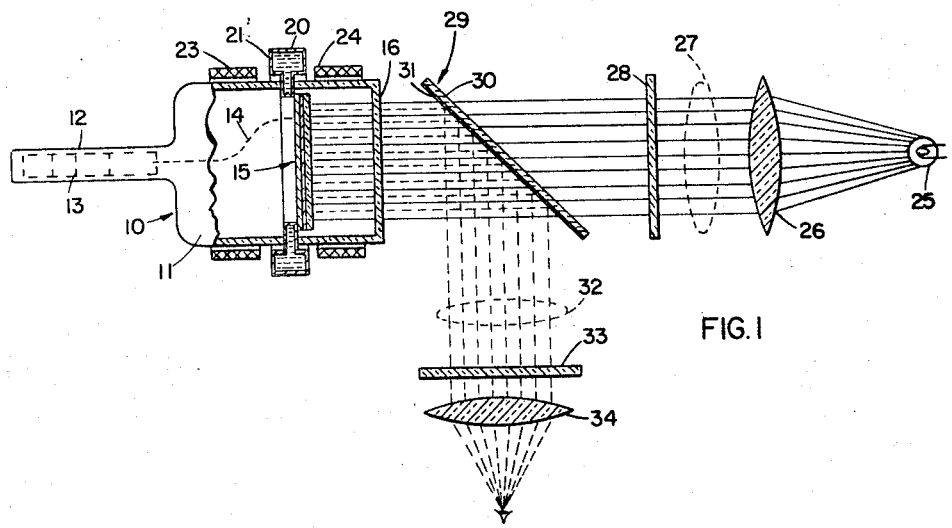
FIG. 1
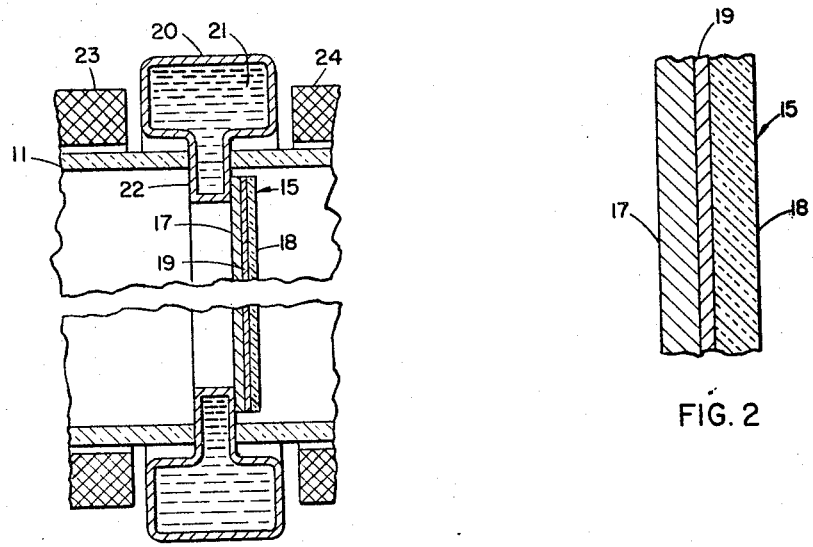
FIG. 3
FIG. 2
INVENTOR.
SAMUEL A. WARD
BY
AGENT

United States Patent Office 3,051,781
Patented Aug. 28, 1962

3,051,781
MEANS OF CONVERTING ELECTRICAL SIGNALS TO VISIBLE PICTURES
Samuel A. Ward, Ridgefield, Conn., assignor to The Machlett Laboratories, Incorporated, Springdale, Conn., a corporation of Connecticut
Filed Apr. 4, 1960, Ser. No. 19,887
12 Claims. (Cl. 178—7.5)

This invention relates to improvements in means and method of optically displaying electrical signals as visible pictures and has particular reference to a novel display tube for converting electrical signals into visible images and to a novel optical system embodying such a tube.

In accordance with this invention, a display tube is provided with an electron gun and a specially constructed composite target which includes a layer of light reflecting material having on its side directed toward the electron gun a layer of superconductive material which is adapted to be scanned by the electron beam from the gun. On the opposite side of the reflecting layer is a layer of magneto-optic material which receives a broad beam of monochromatic polarized light. The superconductor is maintained at a temperature slightly below its critical or transition level whereby it will repel or exclude magnetic flux. However, at each point where the superconductor is contacted by the beam the temperature of the superconductor will become elevated to a level where magnetic flux will pass through.

Such passage of magnetic flux will simultaneously magnetize the discrete areas of the magneto-optic layer opposite the heated areas of the superconductor and through which flux passes, which thus causes rotation of the polarized light beam passing through those discrete areas. The light beam which impinges upon the light reflecting layer after passing through the magneto-optic layer then contains rays some of which were polarized only before entering the tube and others of which have been again modified by rotation of their planes of polarization by the magneto-optical material.

The light reflecting layer reflects substantially all light rays back through the magneto-optic material whereupon the planes of polarization of the modified rays will again be additionally rotated. The beam then passes outwardly of the tube as a visible image containing once-polarized light rays as well as the modified light rays which correspond to the input signal applied to the electron gun. Such an image is passed through a polarized analyzer which is adjusted to transmit only those light rays which have been modified by the magneto-optic layer or only those light rays which have not been modified by the magneto-optic layer. Thus, there is formed a visible image corresponding to the electrical input signal of the tube.

Accordingly, it is a primary object of this invention to provide a novel system and method for converting electrical signals to visible pictures.

Another object is to provide a novel display tube for converting electrical signals to visible images corresponding to the electrical signals.

Another object is to provide a system for converting electrical signals into visible pictures which is highly sensitive to relatively small or weak input signals.

Other objects and advantages of the invention will become apparent from the following description taken in connection with the accompanying drawings, in which FIG. 1 is a schematic illustration partly in axial section of a system embodying the invention;

FIG. 2 is an enlarged fragmentary sectional view of the target used in the display tube of this invention; and FIG. 3 is an enlarged axial sectional view of the target and adjacent portions of the display tube utilized in this invention.

Referring more particularly to the drawings, there is disclosed a display tube 10 embodying an evacuated envelope 11 having a neck portion 12 within which is located an electron gun 13 of suitable design for producing an electron beam 14 in response to an electrical input signal. Suitable accelerating electrodes as well as deflection and aligning means (not shown) are in or associated with the envelope and electron gun for the purpose of directing the electron beam toward the opposite end of the tube and causing it to scan a target 15 in the usual manner common to cathode ray tubes.

Target 15 is preferably spaced inwardly of the envelope between the electron gun 13 and the faceplate 16 which closes the end of the envelope opposite the electron gun, and is supported transversely of the envelope by means to be described hereinafter. The target is a composite structure comprising a layer 17 (FIGS. 2 and 3) of superconducting material on the side of the target facing the electron gun 13, a layer 18 of magneto-optic material on the side facing the faceplate 16, and an intermediate layer 19 of light reflecting material of low magnetic susceptibility.

Superconductor 17 is preferably white tin but may be niobium, indium, tantalum, or any other suitable superconducting material (element, compound or alloy) which excludes magnetic flux when operating at a temperature below its critical or transition temperature. The threshold or critical value of the magnetic flux-producing field which changes the material from superconducting to nonsuperconducting is a function of the temperature. At the critical temperature this field has a value of zero. At some lower temperature a finite value of field will cause the material to change from superconducting to nonsuperconducting. For example, the critical temperature for zero field of white tin is about 3.69° K., for indium it is about 3.37° K., and for tantalum it is about 4.38° K. At 2° K. the critical field value for white tin is about 200 oersteds, for indium about 170 oersteds, and for tantalum is about 730 oersteds. This is in accordance with the Meissner effect (W. Meissner and R. Ochsenfeld, Naturwiss., 21, 787, 1933).

The light-reflecting layer 19 is preferably a relatively thin layer of silver or rhodium but may be any other light-reflecting material having low magnetic susceptibility.

It is pointed out here that the superconductor 17 may be made to a controlled thickness dependent upon the desider thermal pattern retention; that is, since a relatively thin layer will retain heat in the discrete areas for a longer period of time than a thicker layer, the thickness of the layer may be controlled in accordance with the desired storage characteristics of the layer.

The reflecting layer 19 should be thick enough to serve as a mechanical support for the target, but should not be of a thickness which will undesirably interfere with the thermal pattern retention of the superconductor.

The magneto-optic layer 18 is preferably cerous nitrate and may be deposited as a continuous stratum or as a mosaic. Also suitable for layer 18 are potassium chloride, zinc sulfide or other materials capable of exhibiting the Faraday effect of rotation of the plane of polarization of a polarized light beam when passed through a magnetized magneto-optic material in the same direction as the applied magnetic field (Fundamentals of Optics, F. Jenkins and H. White, McGraw-Hill Book Co., 1950, pp. 597–600).

The thickness of the magneto-optic layer 18 determines the total angular rotation of the plane of polarization of rays passing through the magnetized areas of the layer. As pointed out by Alers, Physical Review, 105, 104.

(1957), at a temperature of 1.8° K. cerous nitrate has a rotary power of .5° rotation per mm. of path length per 100 gauss.

In accordance with this invention the superconductor 17 must be maintained at a temperature just below its critical or transition temperature so that it will not pass magnetic flux until it becomes heated above its transition temperature. One manner of accomplishing this is shown in FIG. 3 wherein it will be noted that an annular sink 20 encircles the envelope 11 and contains a supply 21 of liquid helium. Sink 20 is provided on its inner periphery with a flange or rim 22 which penetrates a circumferential area of the envelope 11 which is provided for this purpose with two end walls which are sealed to opposite sides of the flange. Flange 22 may be hollow and the liquid helium 21, which normally has a temperature of about 4° K., may be allowed to penetrate into the flange so as to maintain the flange at a substantially equally low temperature.

The superconductor 17 is mounted directly on the flange 22 and is affixed thereto in a manner which provides good thermal conduction between these two parts, thus permitting the superconductor to be maintained at a temperature below its transition temperature. The actual temperature at which the superconductor is held may be varied in accordance with the transition temperature of the particular superconductive material used, and this may be accomplished by any suitable means such as control of the material of the sink, by control of the thickness of the walls of the sink, or by vacuum pumping the space in the sink 20 over the liquid helium 21 in a manner well known in the art.

Encircling the envelope 11 on the opposite sides of the sink 20 are two coils 23 and 24 such as "Helmholtz" coils which generate a uniform magnetic field with lines of flux extending normal to the plane of the target 15.

In the operation of the tube, the electron gun 13 produces an intermittent or gated beam 14 which is modified by an input signal applied to the gun in a conventional manner. Beam 14 is directed onto and scans or "writes" on the superconductor 17 in the usual manner of a scanning beam common in the art.

In accordance with this invention, the discrete points or areas of the superconductor which are contacted by the gated beam will become heated in an amount determined by the amplitude of the signal and the acceleration voltage. Thus, on the superconductor there is formed a "heat" picture corresponding to the incoming signal. By the Meissner effect, the areas of the superconductor which are not heated by the writing beam will exclude or eject magnetic flux created by coils 23 and 24 due to the low temperature of the superconductor. However, in the discrete areas where the writing beam has heated the superconductor, the magnetic flux will pass through not only the thickness of the superconductor but the entire target 15, whereupon discrete areas of the magneto-optic layer 18 opposite the heated areas of the superconductor become magnetized.

Simultaneously with the foregoing procedure, polarized light is made to illuminate the opposite side of the target 15 by means such as shown in FIG. 1. A light beam from a suitable source 25 passes through a collimating lens 26 whereupon the individual rays become parallel as indicated at 27. The source 25 or lens 26 may be provided with suitable filtering characteristics so that the beam 27 emerging from lens 26 is monochromatic. Beam 27 passes through a light polarizing element 28 which polarizes the beam, and the beam then passes to the tube 10 through a light modifying element 29. Element 29 is a sheet of glass 30 having a thin reflective coating 31 on one side thereof which enables the element to be partially light transmitting and partially light reflecting.

The portion of the polarized beam which is transmitted by element 29 passes through the faceplate 16 of the tube and uniformly illuminates the magneto-optic layer 18 of target 15. The polarized rays falling on layer 18 opposite unheated areas of the superconductor 17 merely pass through layer 18 onto layer 19 and are reflected back through layer 18 substantially unchanged. However, in accordance with the Faraday effect described above, the polarized light rays which pass through the magnetized areas of the magneto-optic layer 18, which areas are disposed opposite the heated areas of the superconductor as described above, are modified by rotation of their plane of polarization. That is, the magnetic flux produced by coils 23 and 24 and which passes through the superconductor in the written or heated areas magnetizes the corresponding adjacent discrete areas of the magneto-optic layer 18 and, in accordance with the Faraday effect, causes rotation of the plane of polarization of polarized light rays incident on such magnetized areas of the magneto-optic layer and directed in the same direction as the applied magnetic field.

The rays which are thus modified by the magneto-optic material upon passing through layer 18 are then reflected back through layer 18 by reflecting element 19, whereupon the plane of polarization will again be rotated slightly by the magneto-optic material. Such second alteration or modification of these rays will be additive to the first modification of the same rays so that when these rays pass outwardly through faceplate 16 their planes of polarization will be quite different from the plane of polarization of the unmodified rays. Thus, there is formed a light picture corresponding to the "heat" picture formed on the superconductor 17.

The light beam formed by the grouped modified and unmodified light rays impinges upon the partially reflecting element 29, as indicated by dotted lines in FIG. 1, and a portion thereof is reflected as beam 32 through a polarized analyzer 33 where the unmodified light rays are eliminated. The remaining modified rays form the visible picture corresponding to the input electrical signal and pass through a suitable focusing lens system 34 for direct viewing or projection, as desired. A "negative" picture may, of course, be produced by eliminating the modified rays at the analyzer 33 instead of the unmodified rays.

The brightness of the resultant picture can be controlled by adjustment of the intensity of the beam produced by source 25, and by adjustment of the thermal sink 20 the storage time can be controlled over wide limits. In a tube of the type described, the sensitivity to small input signals is high due to the fact that a very small temperature change in the semiconductor 17 can cause exclusion of or penetration by the magnetic field.

It will be apparent from the foregoing that all of the objects and advantages of this invention have been accomplished by the provision of a novel system of converting electrical signals to visible pictures, and method of accomplishing same.

It is to be understood that certain changes and modifications may be made by those skilled in the art without departing from the spirit of the invention as expressed in the accompanying claims. Therefore, all matter shown and described herein is to be interpreted as illustrative and not in a limiting sense.

I claim:

1. A device for converting electrical signals into light images comprising an evacuated envelope having a transparent faceplate at one end, an electron gun in the other end of the envelope for producing an electron beam in response to an input signal, a target within the envelope having a layer of superconductive material on one side for scanning by the electron beam, means whereby said superconductive material is adapted to pass magnetic flux when at a temperature higher than its transition temperature and to exclude magnetic flux when at a temperature lower than its transition temperature, a layer of magneto-optic material on the other side of the target for receiving polarized light rays entering the envelope through the faceplate, means whereby said magneto-optic material is adapted to modify said light rays when penetrated by magnetic flux, and a layer of light reflecting material of low magnetic susceptibility between the superconductive and magneto-optic layers for reflecting light passing to it from the magneto-optic layer back through the magneto-optic layer and through the faceplate to the exterior of the device, cooling means adjacent the target for normally maintaining the superconductive layer at a temperature below its transition temperature, and means adjacent the target for producing a magnetic field with lines of flux extending substantially perpendicularly to and adapted to penetrate the target, the target being penetrable by the flux in the areas where the superconductive layer is heated above its transition temperature by the electron beam, and the magneto-optic layer being responsive in the corresponding areas thereof through which flux passes to modify the light rays passing through those areas, whereby the light rays reflected from the target and modified by the magneto-optic layer create a visible image corresponding to the input signal.

2. A device for converting electrical signals into light images comprising an evacuated envelope having a transparent faceplate, an electron gun in one end of the envelope for producing an electron beam in response to an input signal, a target within the envelope comprising a layer of superconductive material positioned to be scanned by the electron beam, means whereby said superconductive material is adapted to pass magnetic flux when at a temperature higher than its transition temperature and to exclude magnetic flux when at a temperature lower than its transition temperature, a layer of magneto-optic material for receiving polarized light rays entering the envelope through the faceplate, means whereby said magneto-optic material is adapted to modify said light rays when penetrated by magnetic flux, and a layer of light reflecting material of low magnetic susceptibility closely superimposed between the superconductive and magneto-optic layers for reflecting light passing to it from the magneto-optic layer back through the magneto-optic layer and through the faceplate exteriorly of the envelope, cooling means connected with the target for normally maintaining the superconductive layer at a temperature below its transition temperature, and means adjacent the target for producing a magnetic field with lines of flux extending substantially perpendicularly to and adapted to penetrate the target, the target being penetrable by the flux in the areas thereof where the superconductive layer is heated above its transition temperature by the electron beam, and the magneto-optic layer being responsive in the corresponding areas thereof through which flux passes to first modify the light rays passing through the magnetized areas toward the reflecting layer and to further modify said rays as they pass through the magnetized areas by reflection from the light reflecting layer, whereby the light rays passing exteriorly of the envelope create a visible image corresponding to the input signal.

3. A device substantially as set forth in claim 2 wherein the cooling means is a heat sink.

4. A device substantially as set forth in claim 2 wherein the cooling means comprises a tubular reservoir encircling the envelope and containing liquid helium, and having means projecting through the envelope and thermally conductively connected to the superconductive layer.

5. A device substantially as set forth in claim 2 wherein the superconductive layer is comprised essentially of white tin and the magneto-optic layer is comprised essentially of cerous nitrate.

6. A device substantially as set forth in claim 2 wherein the superconductive layer is comprised of a superconductive material selected from the group consisting of white tin, niobium, indium and tantalum, and the magneto-optic layer is comprised of a magneto-optic material selected from the group consisting of cerous nitrate, potassium chloride and zinc sulfide.

7. A target for a converter tube, comprising a layer of light reflecting material of low magnetic susceptibility, a layer of superconductive material on one side of the light reflecting layer and means whereby said material is characterized by its ability to repel magnetic flux when below its transition temperature and to readily pass flux through areas heated above said transition temperature, and a layer of magneto-optic material on the opposite side of the light reflecting layer and means whereby said magneto-optic material is characterized by its ability to change the plane of polarization of light rays passing therethrough in areas where magnetic flux passes when the superconductive layer is heated above its transition level, and means whereby said light reflecting layer is adapted to reflect said light rays back through the magneto-optic layer.

8. A target as set forth in claim 7 wherein the superconductive material is white tin and the magneto-optic material is cerous nitrate.

9. A system for converting electrical signals to visible images comprising a target having a layer of superconductive material which is maintained at a temperature below its transition temperature, means whereby said material is adapted to pass magnetic flux when heated above its transition temperature, a magneto-optic layer, and an intermediate layer of light reflecting material of low magnetic susceptibility, means adjacent the target for creating magnetic flux, a light source for directing light onto said light reflecting layer through the magneto-optic layer, a lens between the light source and the target for forming the light from the source into parallel rays, a polarizer between the lens and target for polarizing said rays, means whereby an electron beam containing information supplied by an input signal scans the superconductive layer, means whereby said superconductive layer is penetrable by the magnetic flux in the areas thereof which are engaged and consequently heated by the electron beam to a temperature above the transition temperature, means whereby the magneto-optic layer is magnetizable and responsive to magnetization in the areas through which flux passes to alter the plane of polarization of the light rays passing through those areas whereby the light reflected from the target contains both a first group of rays polarized only by the polarizer and a second group of rays having different planes of polarization effected by the magnetized areas of the magneto-optic layer, a polarized analyzer in the path of the light reflected from the tube for eliminating one of said groups of rays and transmitting the other group, and lens means in the path of the light transmitted by the analyzer for focusing the light at a remote point.

10. A system substantially as set forth in claim 9 wherein the light reaching the target is monochromatic.

11. A system substantially as set forth in claim 9 wherein a reflecting member is placed externally of the tube in the path of the light reflected from the target for directing the light along a path angularly displaced from the path of light passing from the source to the target.

12. A system substantially as set forth in claim 9 wherein the magneto-optic layer further alters the plane of polarization of the light rays passing through the magnetized areas after reflection by the light reflecting layer.

References Cited in the file of this patent

UNITED STATES PATENTS

| | | |
|---|---|---|
| 2,342,778 | Wolf | Feb. 29, 1944 |
| 2,411,155 | Gorn | Nov. 19, 1946 |

FOREIGN PATENTS

| | | |
|---|---|---|
| 513,739 | Great Britain | Oct. 20, 1939 |